No. 797,787. PATENTED AUG. 22, 1905.
D. L. WINTERS.
NEGATIVE ELECTRODE FOR PRIMARY BATTERIES.
APPLICATION FILED JAN. 30, 1905.

Attest:
John Enders.
M. H. Holmes.

Inventor:
David L. Winters,
by Robert Burns
Attorney

UNITED STATES PATENT OFFICE.

DAVID L. WINTERS, OF CHICAGO, ILLINOIS.

NEGATIVE ELECTRODE FOR PRIMARY BATTERIES.

No. 797,787.     Specification of Letters Patent.     Patented Aug. 22, 1905.

Application filed January 30, 1905. Serial No. 243,223.

*To all whom it may concern:*

Be it known that I, DAVID L. WINTERS, a citizen of the United States of America, and a resident of Chicago, in the county of Cook and State of Illinois, have invented certain new and useful Improvements in Negative Electrodes for Primary Batteries, of which the following is a specification.

This invention relates to that type of primary batteries in which copper oxid constitutes the active material of the negative electrode and in which a small body or coating of zinc or like electropositive metal is applied on the copper oxid, so that with an initial immersion in the battery-electrolyte the body or coating of zinc will at once set up a local electrochemical action and increase the conductivity of the negative electrode and the battery-electrolyte to attain an initial efficiency of the battery in a rapid manner; and the present improvement has for its object to provide a simple and economical structural formation of the negative electrode adapted to attain the above-mentioned result in a rapid and efficient manner, as will hereinafter more fully appear, and be more particularly pointed out in the claims.

Figure 1:
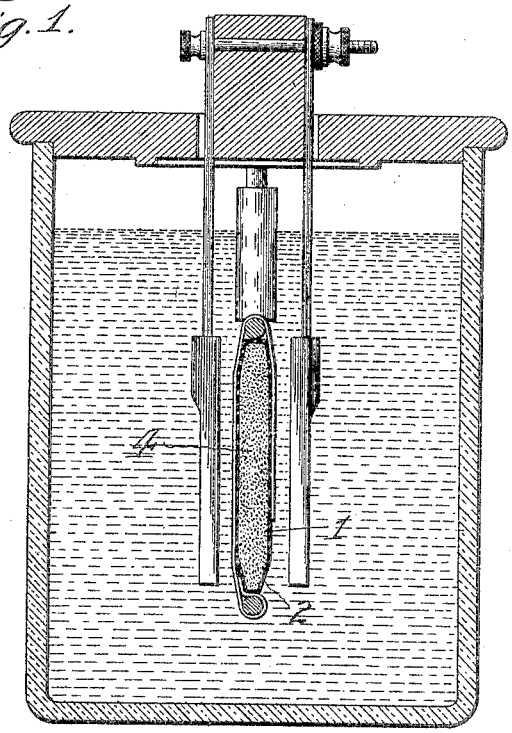
Figure 2:
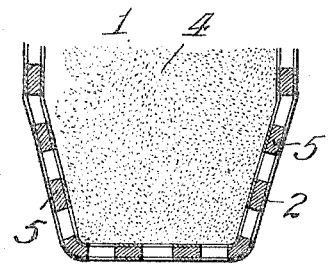
Figure 3:
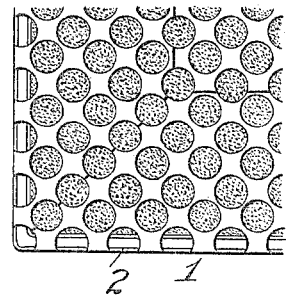

In the accompanying drawings, Figure 1 is a vertical sectional elevation illustrating the application of the present invention to the copper-oxid type of primary batteries. Fig. 2 is an enlarged detail section of the negative electrode. Fig. 3 is an enlarged detail side elevation of the same.

Similar numerals of reference indicate like parts in the several views.

Referring to the drawings, 1 is the negative or copper-oxid electrode, and 3 a pair of positive or zinc electrodes arranged in the usual adjacent yet separated relation in the battery-cell 6. Such electrodes are shown as suspended in the electrolyte by vertical extensions adapted for attachment to the cover or lid of the battery-cell, so as to be readily removable therewith when required. The scope of this invention, however, includes any other usual and well-known means of support.

The material part of the present improvement consists in incasing the compressed mass or body 4 of copper oxid comprising the active material of the negative electrode within a perforated casing or holder 5, preferably of sheet-iron, upon which a coating 2 of zinc has been applied by any ordinary zinc-coating method previous to the formation of the perforations therein, as well as previous to the filling of said casing with the body 4 of compressed copper oxid. Such structural formation and combination of parts affords a very easy and economical manufacture of negative electrodes of the present type in that ordinary perforated galvanized iron can be employed in the formation of the casing or holder, and with the filling of the same with the copper oxid mass the electrode is ready for use without any further preliminary treatment, such as required in the ordinary copper-oxid electrode, which requires the coating of zinc to be laboriously applied after the mass of copper oxid has been molded and compressed into form.

Having thus fully described my said invention, what I claim as new, and desire to secure by Letters Patent, is—

1. The herein-described negative electrode for primary batteries, the same comprising an active body of copper oxid, and a casing therefor formed of zinc-coated perforated sheet-iron.

2. The herein-described negative electrode for primary batteries, the same comprising an active body of compressed copper oxid, and a casing therefor formed of zinc-coated perforated sheet-iron.

Signed at Chicago, Illinois, this 23d day of January, 1905.

DAVID L. WINTERS.

Witnesses:
ROBERT BURNS,
M. H. HOLMES.